(12) United States Patent
Maddalena

(10) Patent No.: US 10,623,790 B2
(45) Date of Patent: Apr. 14, 2020

(54) METHODS AND SYSTEMS FOR CLOUD-BASED CONTENT MANAGEMENT

(71) Applicant: Benjamin Dean Maddalena, Austin, TX (US)

(72) Inventor: Benjamin Dean Maddalena, Austin, TX (US)

( * ) Notice: Subject to any disclaimer, the term of this patent is extended or adjusted under 35 U.S.C. 154(b) by 0 days.

(21) Appl. No.: 15/675,241

(22) Filed: Aug. 11, 2017

(65) Prior Publication Data

US 2019/0052919 A1 Feb. 14, 2019

(51) Int. Cl.
| | |
|---|---|
| *H04N 21/25* | (2011.01) |
| *H04L 29/06* | (2006.01) |
| *G06Q 50/00* | (2012.01) |
| *H04N 21/442* | (2011.01) |
| *H04N 21/2668* | (2011.01) |
| *H04N 21/658* | (2011.01) |

(52) U.S. Cl.
CPC ............. *H04N 21/25* (2013.01); *G06Q 50/01* (2013.01); *H04L 65/4084* (2013.01); *H04L 67/42* (2013.01); *H04N 21/2668* (2013.01); *H04N 21/44218* (2013.01); *H04N 21/6581* (2013.01)

(58) Field of Classification Search
CPC ........... H04N 21/2143; H04N 21/2358; H04N 21/25825
See application file for complete search history.

(56) References Cited

U.S. PATENT DOCUMENTS

| | | | | |
|---|---|---|---|---|
| 5,831,663 | A * | 11/1998 | Waterhouse | H04N 7/106 725/82 |
| 6,326,985 | B1 | 12/2001 | Tazoe et al. | |
| 7,088,238 | B2 | 8/2006 | Karaoguz et al. | |
| 7,151,435 | B2 * | 12/2006 | Brackett | G06K 17/00 340/5.74 |
| 7,272,842 | B2 * | 9/2007 | Kay | G06Q 30/04 348/E7.073 |
| 7,526,539 | B1 | 4/2009 | Hsu | |
| 9,218,107 | B1 | 12/2015 | Eilam | |
| 10,070,805 | B1 * | 9/2018 | Friedman | A61B 5/1113 |
| 2002/0013517 | A1 * | 1/2002 | West | G16H 40/20 600/300 |
| 2004/0172652 | A1 * | 9/2004 | Fisk | H04L 29/06027 725/78 |

(Continued)

FOREIGN PATENT DOCUMENTS

| | | |
|---|---|---|
| EP | 1383035 A2 | 1/2004 |
| EP | 1404213 B1 | 3/2011 |

(Continued)

*Primary Examiner* — Pankaj Kumar
*Assistant Examiner* — Timothy R Newlin
(74) *Attorney, Agent, or Firm* — Matthew E. Burr

(57) ABSTRACT

Systems and methods for a cloud-based content management and displays for community facilities. Content is curated to be displayed on the appropriate monitor. Cloud-based software is coupled with an application that supports the hosting, streaming, management and deployment of digital content to display devices in an organized and reliable manner. The content narrowcast engages residents and supports residents with escalating levels of personalized sounds, images and texts. The system provides a Digital Community Collage, a Digital Memory Box, a Digital Window, and a Digital Care Snapshot.

10 Claims, 2 Drawing Sheets

(56) References Cited

U.S. PATENT DOCUMENTS

| | | | | |
|---|---|---|---|---|
| 2004/0196362 | A1* | 10/2004 | Hoshino | G03B 21/14 348/51 |
| 2004/0262377 | A1* | 12/2004 | Matz | A61B 5/0002 235/375 |
| 2005/0039206 | A1* | 2/2005 | Opdycke | G06Q 30/02 725/35 |
| 2005/0076150 | A1 | 4/2005 | Lee et al. | |
| 2006/0221175 | A1* | 10/2006 | Shen | H04N 7/24 348/14.04 |
| 2007/0024580 | A1* | 2/2007 | Sands | G06F 3/011 345/156 |
| 2007/0074268 | A1* | 3/2007 | Pepper | G11B 27/034 725/136 |
| 2007/0136102 | A1* | 6/2007 | Rodgers | G06F 19/00 705/3 |
| 2009/0198823 | A1* | 8/2009 | Bannister | H04N 7/165 709/230 |
| 2010/0118200 | A1* | 5/2010 | Gelman | G06F 3/041 348/578 |
| 2010/0217657 | A1* | 8/2010 | Gazdzinski | G06Q 30/0251 705/14.5 |
| 2011/0128145 | A1* | 6/2011 | Todd | G06F 19/3418 340/539.11 |
| 2012/0089704 | A1 | 4/2012 | Trahan et al. | |
| 2012/0179968 | A1* | 7/2012 | Madnick | G06Q 30/02 715/719 |
| 2013/0067035 | A1 | 3/2013 | Amant et al. | |
| 2013/0103419 | A1* | 4/2013 | Beaudry | G06Q 50/22 705/3 |
| 2013/0185439 | A1 | 7/2013 | Velasco | |
| 2014/0176599 | A1* | 6/2014 | Watanabe | G06K 9/00228 345/619 |
| 2014/0266736 | A1* | 9/2014 | Cretu-Petra | A61F 13/42 340/573.5 |
| 2015/0062159 | A1* | 3/2015 | Hildreth | G02B 27/0172 345/633 |
| 2015/0084838 | A1* | 3/2015 | Chang | G06F 3/1454 345/2.1 |
| 2015/0142486 | A1 | 5/2015 | Broady et al. | |
| 2016/0050263 | A1 | 2/2016 | Hwang et al. | |
| 2016/0063105 | A1 | 3/2016 | Renkis | |
| 2016/0182613 | A1* | 6/2016 | Brune | H04L 67/10 709/217 |
| 2016/0014108 | A1 | 7/2016 | Chen et al. | |
| 2017/0193787 | A1* | 7/2017 | Devdas | G08B 21/0261 |
| 2018/0075199 | A1* | 3/2018 | Meyerson | G16H 40/63 |
| 2018/0322759 | A1* | 11/2018 | Devdas | H04W 4/023 |

FOREIGN PATENT DOCUMENTS

| | | |
|---|---|---|
| WO | WO03049379 A1 | 6/2003 |
| WO | WO2014045183 A1 | 3/2014 |
| WO | WO2014121024 A1 | 8/2014 |
| WO | WO2015103568 A1 | 7/2015 |

* cited by examiner

METHODS AND SYSTEMS FOR CLOUD-BASED CONTENT MANAGEMENT

TECHNICAL FIELD

The present invention relates to the management of digital content, and in particular to methods and systems to provide cloud-based content management and displays that engage residents and assists in wayfinding in senior living communities, skilled nursing, hospice and similar residential centers.

BACKGROUND

The baby boom generation is entering old age. In response to this demographic challenge, resources to assist the elderly are becoming important and more available. Among such resources are residential communities, retirement developments, assisted living centers, nursing homes, and the like. Similar facilities exist for the disabled and infirm.

Residents, family, and visitors to facilities for the elderly, infirmed or disabled can be overwhelmed or simply unfamiliar with the physical infrastructure of the location, such as the location of a residential building or the dining room, or the resources and activities of the facility. It may be the case that the facility is understaffed or has poorly trained staff that are not helpful to orient people with such concerns.

Furthermore, some residents of such facilities may suffer from disorientation, memory loss, and other cognitive deficits.

It would be advantageous, therefore, to have systems and methods to provide important and useful information about the facility to residents and visitors. Such systems and methods would also be helpful to provide orientation content to residents, including images and sounds of familiar places, people, pets, and so forth, to enhance the living experience. To address these needs, the present invention provides a system of monitors or devices coupled to a cloud-based digital content management system to provide information to residents and visitors as well as to enhance the living experience.

SUMMARY

The present invention provides methods and systems to provide cloud-based content management and displays that engage residents and assists in wayfinding in senior living communities, skilled nursing, hospice and similar residential centers. The purpose of the invention is to provide cloud-based content management and displays that engages residents and assists in wayfinding in senior living communities, skilled nursing, hospice and similar residential centers. Content is curated to be displayed on the appropriate monitor or device. The invention is a system that integrates content servers, devices, display monitors, Bluetooth capabilities and software.

The software is a cloud-based software system (software as a service) coupled with an application, for example, that supports the hosting, streaming, management and deployment of digital content to display devices in an organized and reliable manner.

The content narrowcast engages residents and supports memory care (Dementia/Alzheimer's) with escalating levels of personalized sounds, images and texts.

An exemplary embodiment of a system of the present invention provides: a Digital Community Collage, a Digital Memory Box, a Digital Window, and a Digital Care Snapshot.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In the following discussion and in the claims, the terms "including" and "comprising" are used in an open-ended fashion, and thus should be interpreted to mean "including, but not limited to." Additionally, it will be understood that the article "A" in upper or lower case is intended to mean "one or more" as appropriate from the context. Also, the term "connect" or "connected" or similar term, where used if at all, is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

Figure 1:
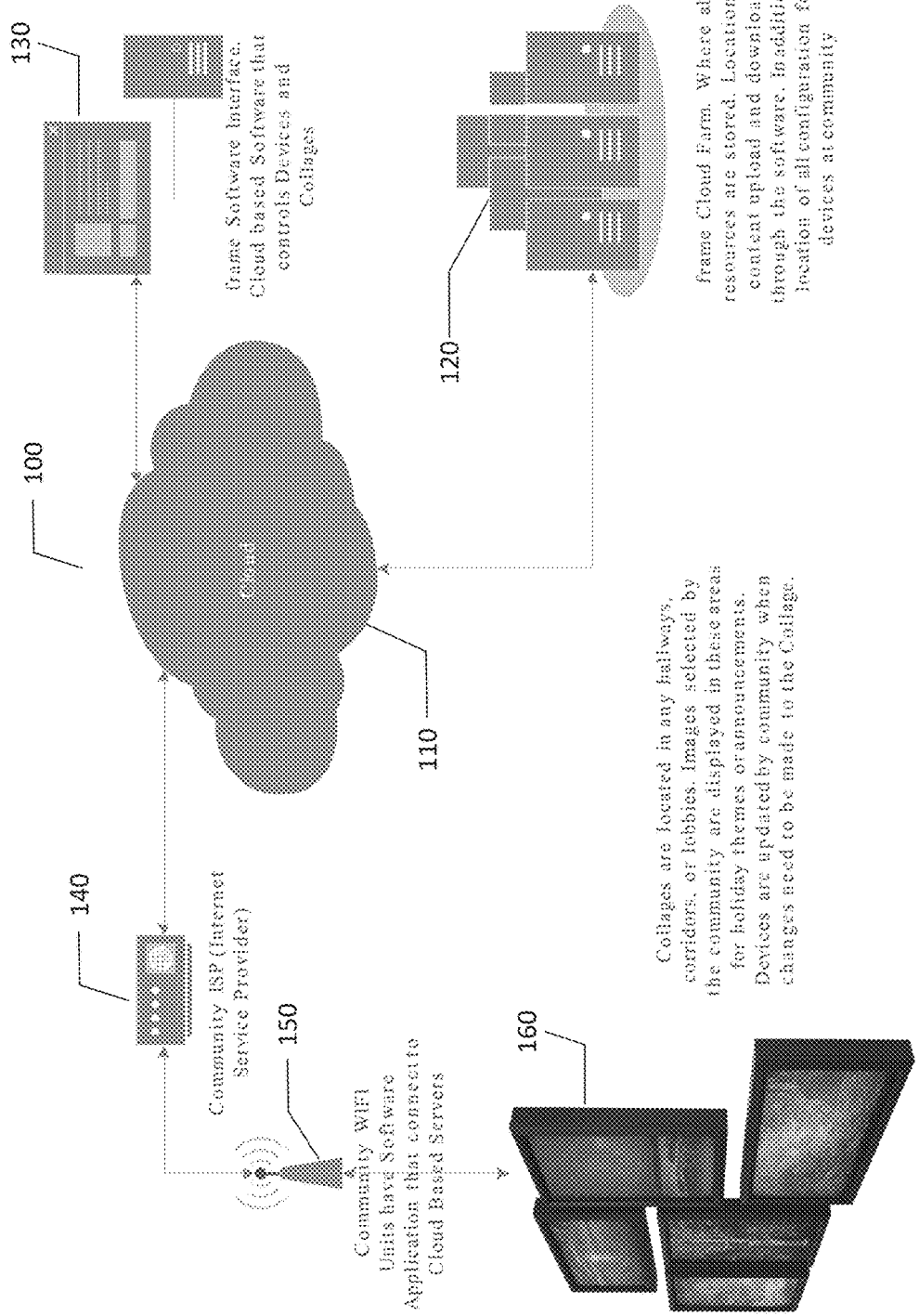
FIG. 1 is a diagrammatic illustration of a system of the present invention.

FIG. 1 is a diagrammatic illustration of a system of the present invention. Referring to FIG. 1 of the drawings, the reference numeral 100 generally designates a system embodying features of the present disclosure. The system 100 includes, in part, the internet 110, also referred to herein as the "cloud," and cloud farm 120 which contains resources and content stored in the cloud. Frame Cloud Farm 120 is where all resources are stored. It is the location of content upload and download through the system software. In addition, it is the location of all configuration for devices at the community. Among the resources in cloud 110 is included user interface software 130 with which to control devices and content of the system 100. Frame software interface is cloud based software that controls the devices and collages.

A plurality of display units 160, or other devices of the system, that are controlled by interface software 130 are communicatively connected to interface software 130 by an internet service provider (ISP) 140 via WiFi connection 150 pursuant to the requirements of the display or device 160. Each community subscribing to a system of the present invention is free to contract with any ISP 140 suitable for their needs.

Examples of the uses of the monitors or devices 160 include collages, which are images or information displayed on devices 160, and which are located in hallways, corridors, lobbies, and other common areas of the community facilities. Images selected by the community are displayed in these areas for holiday themes or announcements. Devices 160 are updated by the community when changes need to be made to the Collage. Similarly, a Digital Window is a monitor that displays nature scenes, for example, and is located inside a resident's room or inside an infirmary. A Digital Care Snapshot is a monitor located in a resident's room that displays personal information about a resident to assist the staff in providing personalized care. Examples of such information include the residents home town, parents names, siblings names and ages, pet names, favorite tv shows, movies, and songs, and so forth. The content of the Digital Care Snapshot can be revised or updated by the resident or the resident's family.

Figure 2:
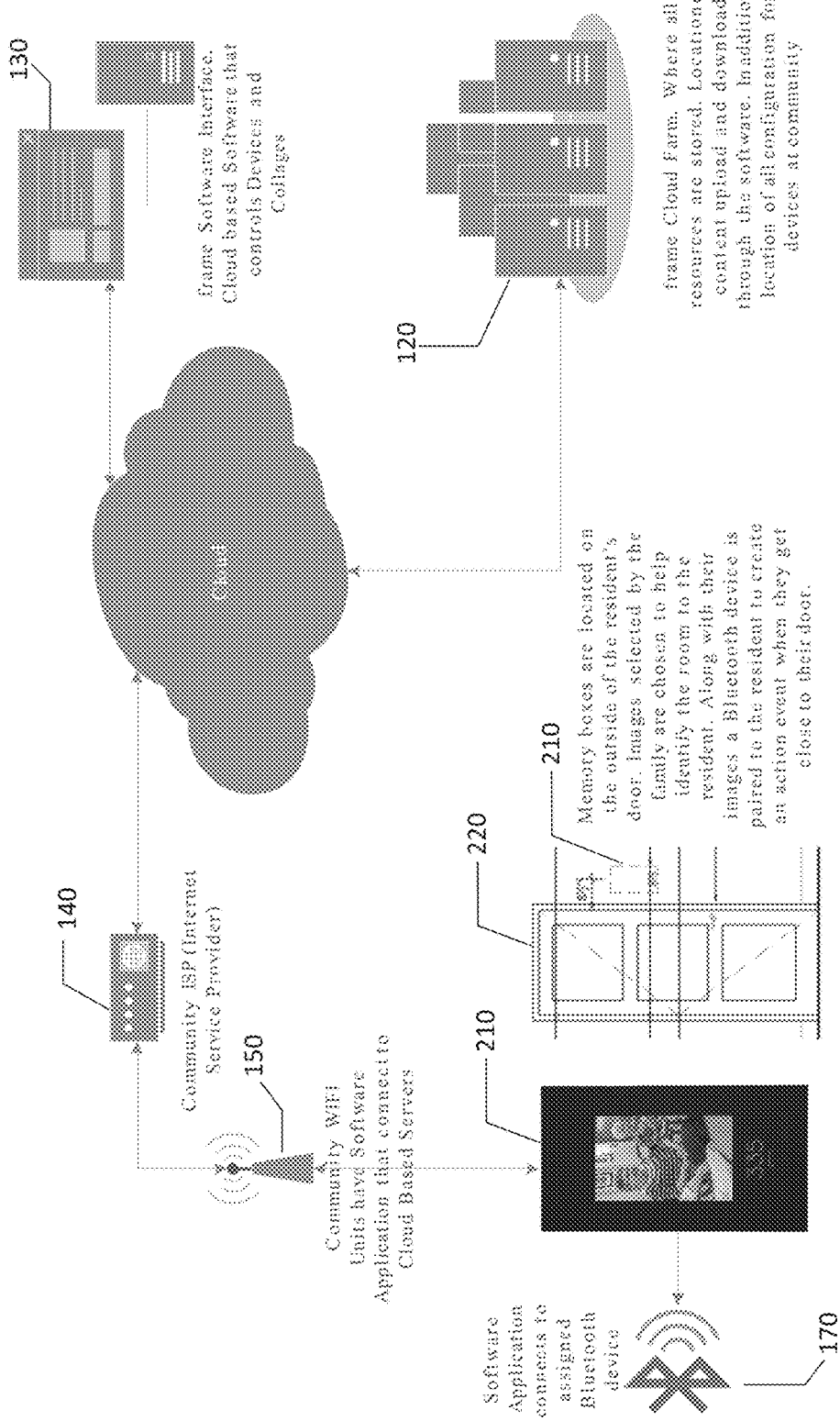
FIG. 2 is a diagrammatic illustration of the system of FIG. 1 with memory box detail.

FIG. 2 is a diagrammatic illustration of the system of FIG. 1 with memory box detail. Memory boxes 210 are located on the outside of the resident's door 220. Images selected by the family are chosen to help identify the room to the resident. Along with the images, a Bluetooth device 170 is paired to the resident to create an action event when they get close to their door.

Devices 160 located in other areas of the community provide content which includes a Digital Community Collage, a Digital Memory Box, a Digital Window, and a Digital Care Snapshot. Additional information about each of these features of the system is provided below.

In practice, devices 160 such as display units or monitors may be located in facility reception areas and even outside at the entrance doors, as well as hallways and corridors, common areas, recreational areas, residence rooms, and so forth. Content is curated by an administrator, or automatically, and fed to designated display units from the cloud farm. The cloud farm 120 consists, at least in part, of internet servers that store and deliver the specified content. Content can be static, such as for example a display of the floor plan of a building or the layout of buildings on a property, or dynamic, such as for example a slide show of images or an updated program of facility activities, meal menus, and the like. Additionally, the content may include multi-media content including video or music and speech to accompany images. In specific exemplary alternative embodiments, one or more of the display units are touch screens that can be navigated by a resident, visitor or staff member.

Examples of content include wayfinding arrows displayed on monitors in hallways and corridors, slide shows of family, pets and favorite places of residents, displayed on monitors in a resident's room to provide comfort to the resident and to enhance memory or reduce cognitive deficits of the resident and reduce disorientation. Content intended specifically for a particular resident to be displayed in the resident's room may also include information such as the resident's name, home location, names of family members and pets, as well as information about personal taste such as music, food, favorite movies and tv shows, major life events or accomplishments, and so forth. This information is not only helpful to the resident, but also helps the attending staff to provide personalized care to the resident.

Additional examples of content include meal menus, updated schedules of activities, staff schedules, and so forth.

A system of the present invention allows a facility to customize the content fed to the display units on a display-by-display basis dynamically on the fly with any content deemed suitable.

An exemplary embodiment of a system of the present invention provides:

A Digital Community Collage-three to five large format monitors in common areas which display dynamic content of general interest to residents, staff and the public.

A Digital Memory Box-individual tablets mounted in customized enclosures with integrated code-required room signage outside resident room doors. A resident wearing a Bluetooth device in the form of a bracelet or necklace when walking next to his assigned memory box will alert him in the form of a familiar image that he is at his room.

A Digital Window-upon entry, a resident's Bluetooth wristband, for example, or other suitable wireless accessory, triggers a second tablet inside the room with the same image that reinforces the Memory Box stimuli wayfinding. This device continues to display personalized content.

A Digital Care Snapshot-individual tablets mounted outside patient room doors in skilled nursing units which display specific information and alerts for caregivers regarding patient care.

In addition to the foregoing embodiments, the present disclosure provides programs stored on non-transient machine readable medium to operate computers and devices according to the principles of the present disclosure. Machine readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate in the foregoing exemplary types of machine readable media, and any combinations thereof. The programs and applications stored on the machine readable media in turn include one or more machine executable instructions which are read by the various devices and executed. Each of these instructions causes the executing device to perform the functions coded or otherwise documented in it. Of course, the programs can take many different forms such as applications, operating systems, Perl scripts, JAVA applets, C programs, compilable (or compiled) programs, interpretable (or interpreted) programs, natural language programs, assembly language programs, higher order programs, embedded programs, and many other existing and future forms which provide similar functionality as the foregoing examples, and any combinations thereof.

Many modifications and other embodiments of the content management system described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for cloud-based content management of digital content for displays in community facilities that house residents such that each resident is assigned to a room in the community facility, each room having an entrance, the system comprising:
   a cloud-based content farm;
   an internet service provider to provide access to the cloud-based content farm;
   software to mediate system controls of devices and content and to manage curated content;
   a plurality of devices to display curated content specific to each one of the plurality of devices; and
   communicative connections between the content farm, software and devices,
   the plurality of devices comprising
      collages consisting of images or information displayed on devices in common areas of the community facilities;
      a memory box outside the resident's room for wayfinding, the memory box consisting of integrated code-required room signage that is communicatively paired with the resident such that the memory box displays a familiar image to alert the resident that the resident is at the resident's room;
      a digital window inside the room consisting of a tablet that is triggered by the memory box communicative pairing with the resident to display the same alert image displayed by the memory box to reinforce the memory box wayfinding stimulus; and
      a digital care snapshot for displaying resident information to facility staff to enhance personalized care.

2. The system of claim 1, wherein the content farm comprises internet servers.

3. The system of claim 1, wherein at least one of the plurality of devices comprises a display.

4. The system of claim 1, wherein the communicative connections comprise WiFi.

5. The system of claim 1, wherein the communicative connections comprise Bluetooth.

6. The system of claim 1, wherein the community facility is an assisted living facility.

7. The system of claim 1, wherein the community facility is a nursing home.

8. The system of claim 1, wherein the community facility is a retirement home.

9. The system of claim 1, wherein the community facility is a hospice.

10. A method for managing content provided to a plurality of displays, for displays in community facilities that house residents such that each resident is assigned to a residence in the community facility, each residence having an entrance, the method comprising the steps of:
   providing a cloud-based content farm;
   providing an internet service provider to provide access to the cloud-based content farm;
   providing software to mediate system controls of devices and content and to manage curated content;
   providing a plurality of devices to display curated content specific to each one of the plurality of devices;
   providing collages consisting of images or information displayed on devices in common areas of the community facilities;
   providing a memory box outside the resident's room for wayfinding, the memory box consisting of integrated code-required room signage that is communicatively paired with the resident such that the memory box displays a familiar image to alert the resident that the resident is at the resident's room;
   providing a digital window inside the room consisting of a tablet that is triggered by the memory box communicative pairing with the resident to display the same alert image displayed by the memory box to reinforce the memory box stimulus wayfinding; and
   providing a digital care snapshot for displaying resident information to facility staff to enhance personalized care
   providing communicative connections between the content farm, software and devices;
   curating content for display on each designated device of the plurality of devices; and
   displaying the curated content for each device designated for the content.

* * * * *